United States Patent [19]

Dear

[11] Patent Number: 5,074,609

[45] Date of Patent: Dec. 24, 1991

[54] ADJUSTABLE DECK LID HINGE PIVOT

[75] Inventor: Daniel W. Dear, Sterling Heights, Mich.

[73] Assignee: General Motors Corporation, Detroit, Mich.

[21] Appl. No.: 559,740

[22] Filed: Jul. 30, 1990

[51] Int. Cl.[5] .............................................. B62D 25/12

[52] U.S. Cl. ...................................... 296/76; 296/146; 16/235; 16/245

[58] Field of Search ................................ 296/76, 146; 16/235-240, 245, 246

[56] References Cited

U.S. PATENT DOCUMENTS

| | | | |
|---|---|---|---|
| 2,120,685 | 6/1938 | Soss et al. | 16/288 |
| 2,583,950 | 1/1952 | Kirschner | 16/238 |
| 2,591,979 | 4/1952 | Turley | 49/400 |
| 3,152,355 | 10/1964 | Ferguson | 16/238 |
| 4,124,954 | 11/1978 | Redick | 49/236 |
| 4,186,476 | 2/1980 | Mair et al. | 29/407 |
| 4,646,472 | 3/1987 | Sugawara | 49/386 |
| 4,893,863 | 1/1990 | Skonieczny et al. | 296/76 |

FOREIGN PATENT DOCUMENTS

| | | | |
|---|---|---|---|
| 208085 | 1/1987 | European Pat. Off. | 16/235 |
| 3100138 | 8/1982 | Fed. Rep. of Germany | 16/243 |
| 3712216 | 10/1988 | Fed. Rep. of Germany | 296/76 |

*Primary Examiner*—Dennis H. Pedder
*Attorney, Agent, or Firm*—William A. Schuetz

[57] ABSTRACT

This disclosure relates to an adjustable hinge assembly for a vehicle closure or deck lid which can be readily, vertically adjusted to enable the deck lid to be positioned so as to be flush with adjacent quarter panels of the vehicle when in a closed position. This is achieved by providing a stationary hinge box with slotted sides and a horizontal slide with skewed slotted sides to effect vertical movement of a hinge pivot of a hinge strap to raise and lower a deck lid connected to the hinge strap.

4 Claims, 4 Drawing Sheets

ADJUSTABLE DECK LID HINGE PIVOT

The present invention relates to an adjustable hinge assembly and, more particularly, to an adjustable hinge assembly for a vehicle closure or deck lid which can be readily, vertically adjusted to enable the closure or deck lid to be positioned so as to be flush with adjacent quarter panels of the vehicle when in its closed position.

It is common to provide a pair of hinge assemblies for swingably mounting a closure, such as a deck or trunk lid to body structure of an automotive vehicle to enable the deck lid to be swingably moved between open and closed positions. These known hinge assemblies have included hinge boxes which are mounted to the vehicle body structure, such as an inner shelf panel, horizontally disposed hinge pins or pivots carried by the hinge boxes and straps having one end connected or mounted to the deck lid and their other ends pivotally connected to the hinge pins. In order for the deck lid to be properly aligned with the adjacent exterior body structure, including the rear quarters, end caps, tail lamps, rear end panels etc., it is common to provide an adjustment means to enable the deck lid to be adjusted side to side and fore and aft of the quarter panels. One way to achieve this adjustment is to provide oversize holes or slots in the inner panel of the deck lid or in the straps to enable the deck lid to be shifted somewhat relative to the straps prior to tightening down fasteners passing through holes in the strap and the inner panel of the deck lid. Heretofore, gaps and flushness between the exterior surface of the deck lid and rear quarter panels has been achieved by vertically adjusting the position of the deck lid latch carried by the rear body structure of the vehicle and by adjusting the vertical position of the hinge boxes on the vehicle body support structure or inner shelf panel via vertical slots in the support or brackets of the hinge box and then clamping the same together via bolts. Flushness has also been achieved by providing the hinge box with vertical slots through which the hinge pivot extends and supporting the hinge pin via an eyebolt which can be vertically adjusted to raise and lower the deck lid, as evidenced by U.S. Pat. No. 4,893,863, assigned to the same assignee as the present invention.

The present invention provides a hinge assembly for a closure or deck lid of an automotive vehicle which can be preassembled to the closure or deck lid, the hinge boxes floated into position and secured to a vehicle support while the deck lid is temporarily held in a closed position, and which has a novel adjustment means for readily, vertically positioning the deck lid so that it can be flush with the adjacent quarter panels of the vehicle after the hinge boxes are secured to a support structure and closure opening assists, such as torque rods or springs are installed.

Accordingly, an important object of the present invention is to provide a new and improved hinge assembly for a closure or deck lid of an automotive vehicle which has a novel adjustment means for readily, vertically positioning the deck lid so that it can be flush with the adjacent quarter panels of the vehicle and which does not require adjusting the position of the hinge box after it is secured to a vehicle support structure.

Another object of the present invention is to provide a new and improved hinge assembly, as defined in the preceding object, and in which the hinge boxes have vertically extending slots in their sides through which a horizontally disposed hinge pin or pivot means extends and in which the adjustment means comprises horizontally movable slides having spaced sides which straddle opposite sides of the hinge boxes and which have slots which receive the hinge pins and overlie and are skewed with respect to the slots in the hinge boxes, and fastener means threadably engaged with the slides and rotatably connected to the hinge boxes, the fastener means, when rotated, effecting a raising or lowering movement of the hinge pin means and hence, the vertical position of the deck lid.

Yet another object of the present invention is to provide a new and improved hinge assembly, as defined in the next preceding object, and in which the slides are supported and guided for horizontal movement by the hinge boxes.

The present invention further resides in various novel constructions and arrangement of parts, and further objects, novel characteristics and advantages of the present invention will be apparent to those skilled in the art to which it relates and from the following detailed description of the illustrated, preferred embodiment thereof made with reference to the accompanying drawings forming a part of this specification and in which similar reference numerals are employed to designate corresponding parts throughout the several views, and in which.

Figure 1:
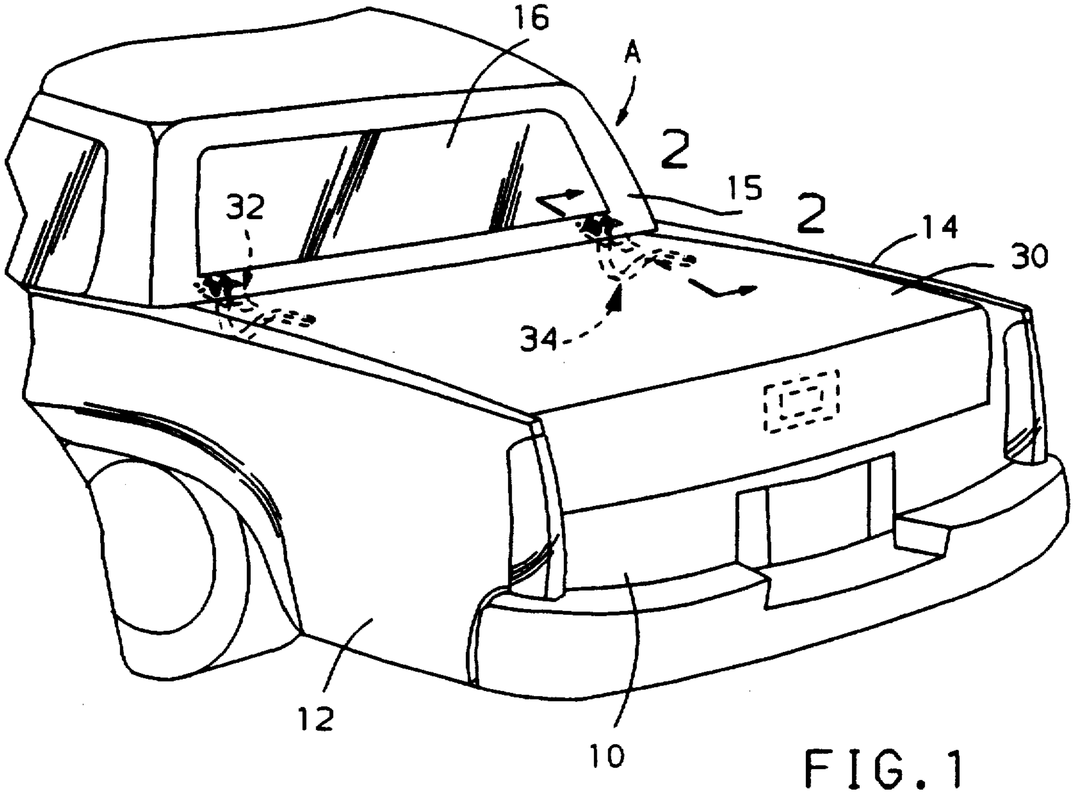
FIG. 1 is a fragmentary rear perspective view of a vehicle having a deck lid and incorporating the novel hinge assembly of the present invention.
Figure 2:
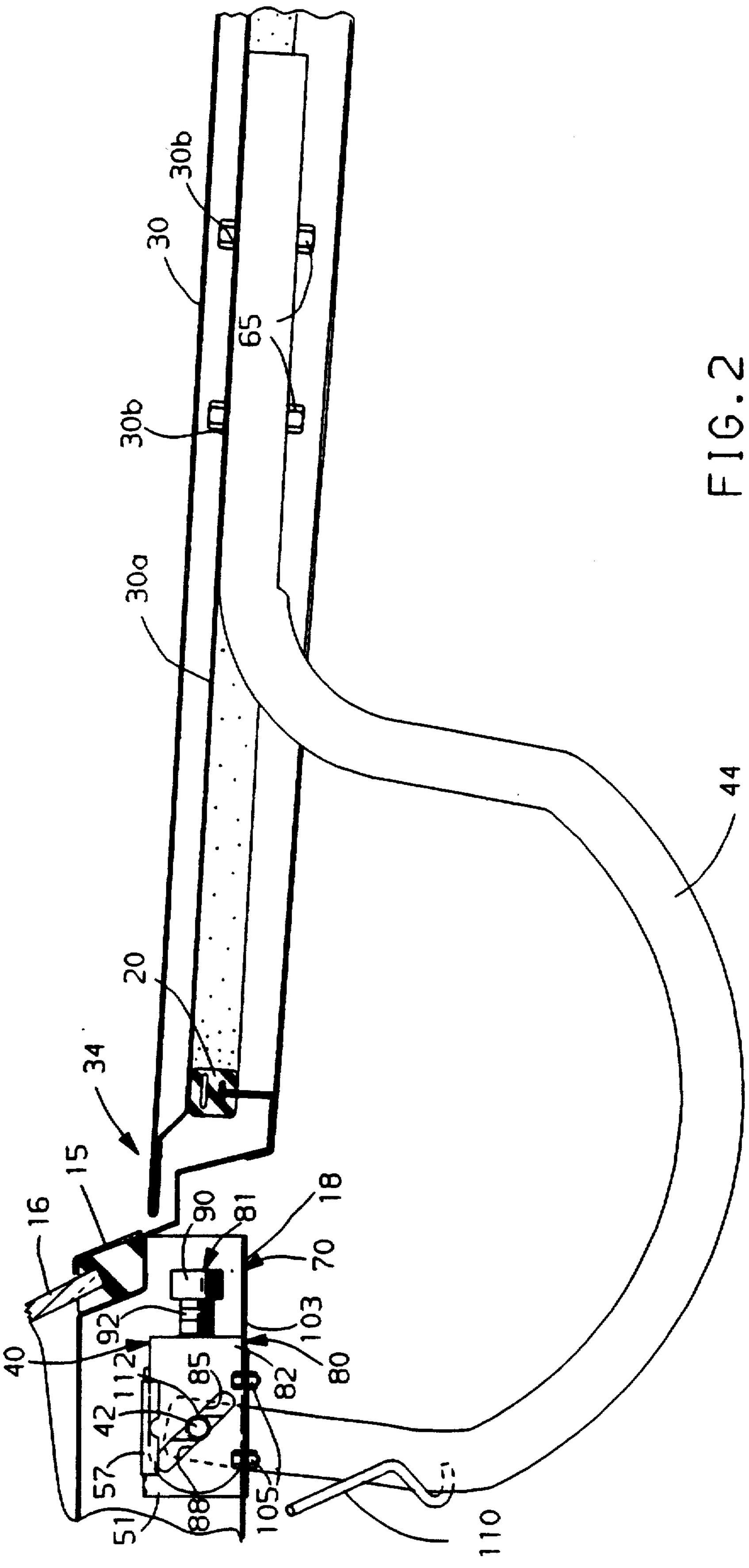
FIG. 2 is an enlarged fragmentary sectional view taken along the lines 2—2 of FIG. 1.

Referring to FIG. 1 of the drawings, an automotive vehicle A is thereshown. The vehicle A has vehicle body structure including a rear 10 extending transversely of the vehicle, a pair of side rear quarter panels 12 and 14, transverse body structure 15 defining an opening for a rear window 16 and a transversely extending support or inner shelf panel 18 (see FIG. 2) downwardly adjacent from the rear window 16. The side rear quarter panels 12 and 14, the rear 10 and the transverse body structures 15 and 18 define a rear compartment or trunk opening and together at their upper ends carry a circumferentially extending seal 20 surrounding the trunk compartment. The vehicle A additionally includes a rear deck lid or trunk 30 which is swingably mounted to the inner shelf panel 18 via a pair of hinge assemblies 32, 34 for movement between a closed position, as shown in FIG. 1, in which the deck lid 30 closes off access to the rear compartment and engages the seal 20 and an open position (not shown) to provide access to the rear compartment. The rear deck lid 30 is adapted to be latched in its closed position, as shown in FIG. 1, via a suitable latch mechanism (not shown) when the deck lid 30 is moved to its closed position.

The hinge assemblies 32 and 34 are of an identical construction and hence only the hinge assembly 34 will be described in detail. The hinge assembly 34 comprises, in general, a hinge box 40, a hinge pin or pivot means 42, and a goose neck shaped hinge strap 44 having one end which is adapted to be bolted or secured to the underside of the deck lid 30 and its other end pivotally connected to the hinge pin 42.

Figure 5:
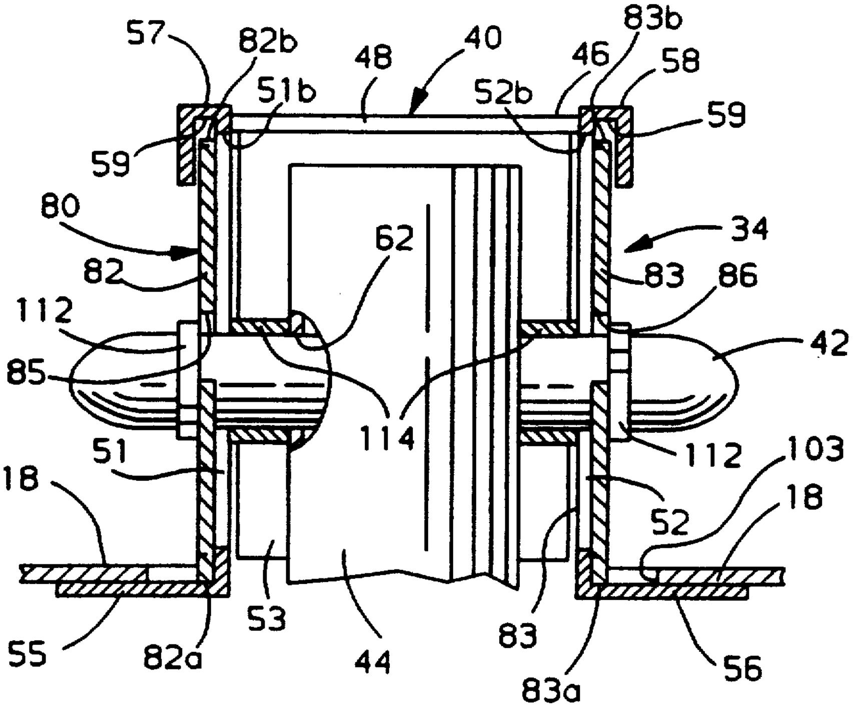
FIG. 5 is a fragmentary sectional view looking in the direction of the arrows 5—5 of FIG. 3.
Figure 3:
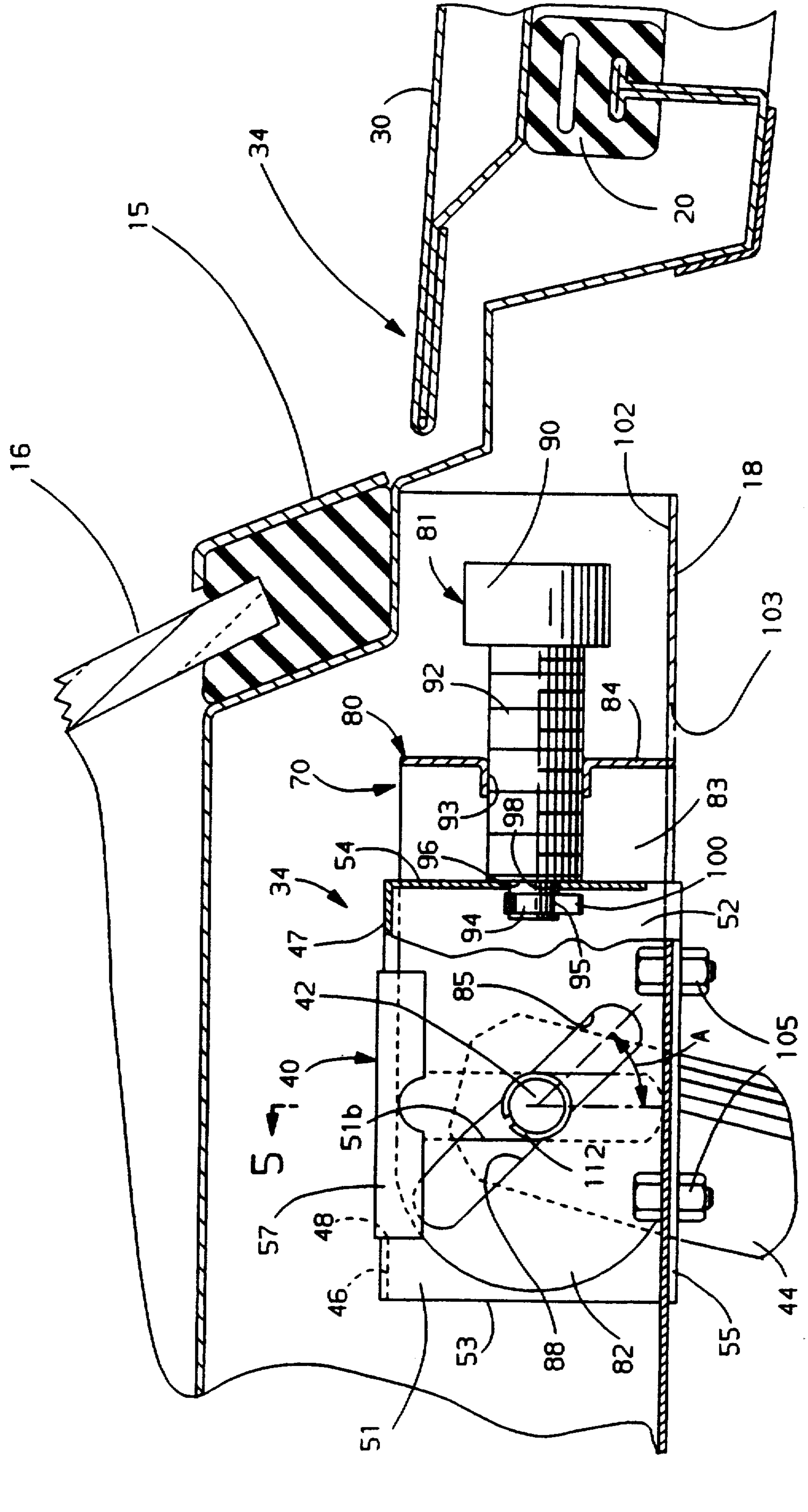
FIG. 3 is a further enlarged fragmentary sectional view of the hinge assembly of the present invention and showing the same attached to a support in the vehicle.
Figure 4:
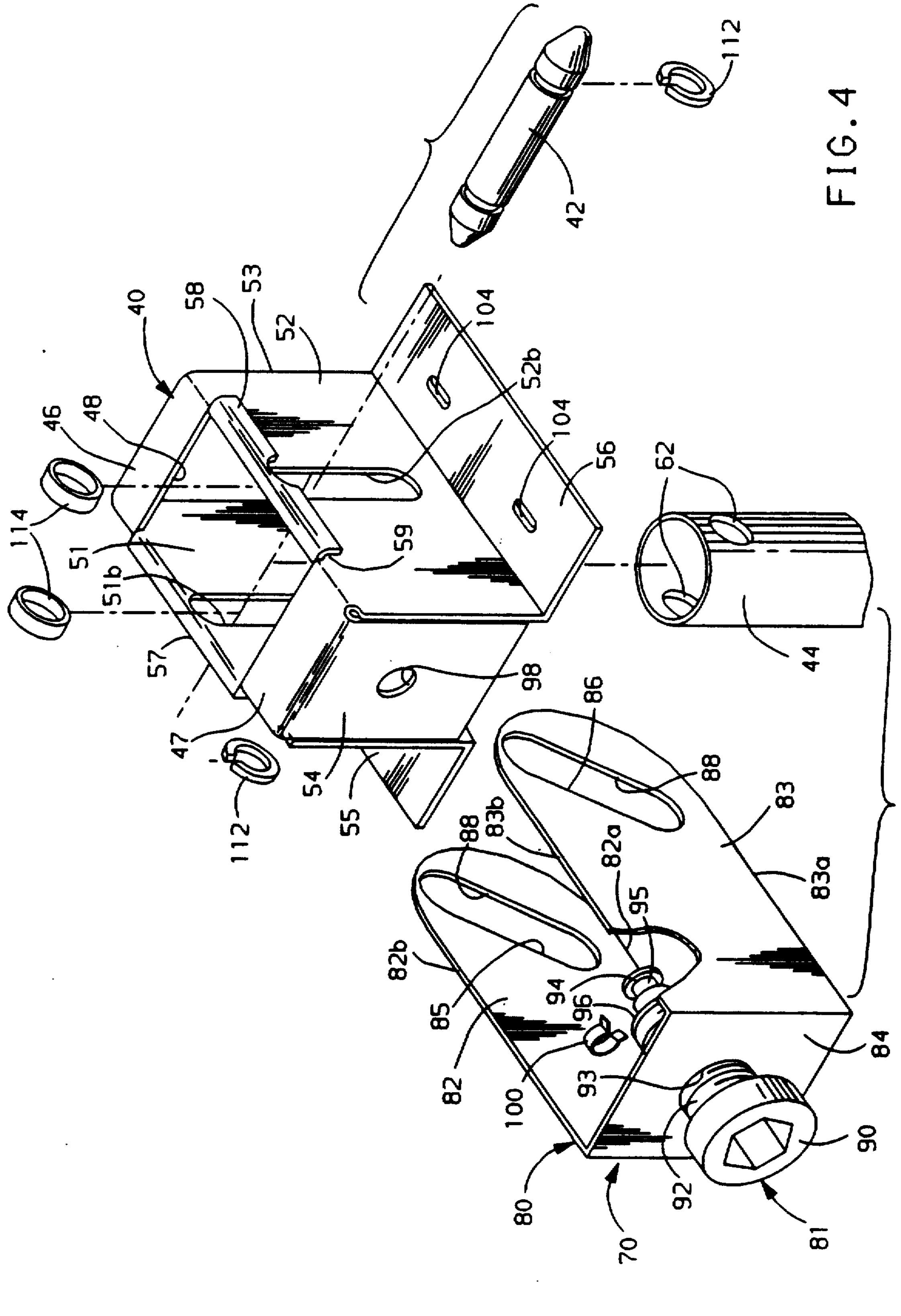
FIG. 4 is an exploded view of the novel hinge assembly of the present invention.

As best shown in FIGS. 3 and 4, the hinge box 40 comprises a suitable sheet metal stamping, preferably made from steel, which is bent or shaped to the configuration shown in FIGS. 3 and 4. The hinge box comprises a pair of spaced top portions 46 and 47, a top opening 48 between the portions 46 and 47, a pair of vertically extending sides 51 and 52 and front and rear ends 53 and 54 integral with the top portions 46 and 47, respectively, and extending normal thereto. The hinge box 40 is generally of a rectangular box shape and the ends 53 and 54 are separated along their sides from the sides 51 and 52 (see FIG. 4). The ends 53 and 54 could be suitably welded to the sides 51 and 52 of the hinge box 40, if desired. In addition, the sides 51 and 52 of the hinge box 40 at their lower ends are provided with planar flanges 55 and 56 extending normal thereto to enable the hinge box 40 to be bolted to the inner shelf panel or support 18 of the vehicle A. Further, the sides 51 and 52 of the hinge box at their longitudinal midpoint are provided with aligned openings 51*b* and 52*b* respectively. As shown in FIGS. 3-5, the hinge box 40 is bent and formed to define with the adjacent sides 51 and 52 a pair of downwardly facing guide channels 57 and 58. The channels 57 and 58 are integral with the top of the sides 51 and 52 between the top portions 46 and 47 and define downwardly facing openings 59, and for a reason to be hereinafter more fully described.

The hinge box 40 supports the hinge strap 44 and the hinge pivot or pivot means 42. The hinge pin 42 comprises a circular pin like member which extends through aligned openings 62 of the hinge strap 44 and which also extends through the aligned openings 52*b* and 51*b* in the sides 52 and 51 of the hinge box 40. The hinge strap 44 is hereshown as being tubular and, at its inner end, has the previously mentioned aligned openings 62 through which the hinge pin 42 extends.

The hinge strap 44 its rear end is partially flattened (see FIG. 5) and is adapted to be suitably bolted to an inner panel 30*a* of the deck lid 30 via suitable bolts or fasteners 65. As is conventional in the art, the inner panel 30*a* of the deck lid 30 would be provided with either oversize or slotted openings 30*b* to enable the deck lid 30 to be subsequently slightly adjusted side to side between the rear quarter panels 12 and 14 and fore and aft of the rear quarter panels 12 and 14 for proper alignment purposes. In addition, as is conventional in the art, the deck lid latch mechanism (not shown) at the rear end 10 of the vehicle would be vertically adjustable to position the rear end of the deck lid 30 vertically vis-a-vis the quarter panels 12 and 14 so as to effect proper alignment and flushness therewith. Since these adjustments are conventional in the art, they have not been shown in detail in the drawings and will not be described in detail.

In accordance with the provisions of the present invention, a novel adjustment means 70 is provided to enable the deck lid 30 at its end adjacent the rear window 16 to be readily positioned as to be flush with the adjacent exterior surface of the vehicle, i.e., the rear quarter panels 12 and 14. To this end, the openings 51*b* and 52*b* in the sides 51 and 52 of the hinge box 40 are in the form of vertically extending linear slots instead of just being circular openings and a slide 80 and adjustable fastener means 81 are provided. The slide 80 comprises a U-shaped sheet metal member which straddles the hinge box 40. The slide 80 has a pair of spaced side walls 82 and 83 a rear end wall or bight 84. The slide 80 along the lower edge surfaces 82*a* and 83*a* of the sides 82 and 83 thereof is slidably supported by the flanges 55 and 56 of the hinge box 40, respectively, for horizontal reciprocable movement. The sides 82 and 83 of the slide 80 along their top edge portions 82*b* and 83*b* are slidably received within the guide channels 57 and 58, respectively, the latter serving to guide the slide 80 when horizontally moved. The sides 82 and 83 of the slide 80 are also provided with aligned, elongated linear slots 85 and 86 which , respectively, overlie the slots 51*b* and 52*b* of the sides 51 and 52 of the hinge box 40 and which are skewed with respect to the slots 51*b* and 52*b*. That is, the slots 85 and 86 have a longitudinal axis which intersects and forms an acute included angle A, such as a 45° included angle, with the longitudinal vertical axis of the slots 51*b* and 52*b*, respectively. The hinge pin 42 extends through the slots 85 and 86 and engages or rests against the sides 51 and 52 of the slide along lower edge surfaces 88 defining the lower side of the slots 85 and 86, as viewed in the drawings.

As can be seen from FIG. 3, movement of the slide 80 to the right will cause the surface 88 on the sides 82 and 83 to cam the hinge pin 42 upwardly to raise the deck lid 30 and movement of the slide 80 to the left will allow the hinge pin 42 to be lowered to lower the deck lid 30.

The slide 80 is horizontally moved and positioned by the adjustable fastener means 81. The fastener means comprises a tool engaging head 90, a threaded shank 92 which is threadably engaged with a mating threaded opening 93 in the bight 84 of the slide and a distal end 94 which is rotatably connected to the end wall 54 of the hinge box 40, the end wall 54 facing toward the rear end of the vehicle. The head 90 is hereshown as having a hex shaped depression for reception of an allen wrench, although other forms of tool engaging heads could be employed. As best shown in FIG. 4, the distal end 94 is circular in cross-section, has an undercut 95 and is of a lesser diameter than the shank portion 92. A shoulder 96 is formed at the juncture of the shank portion 92 and distal end 94. The end wall 54 has a circular opening 98 which freely rotatably receives the distal end 94, but which is of a lesser diameter than the shank portion 92. The distal end is rotatably connected to the end wall 54 of the hinge box 40 by inserting the distal end through the opening 98 in the end wall until the shoulder 96 engages the outer side of the end wall 53 and then snap fitting a retainer clip 100 over the undercut 95, the clip 100 engaging the inner side of the end wall 54. This prevents axial displacement of the fastener means 81 relative to the hinge box 40.

In operation, the deck lid 30 and hinge assemblies 32 and 34 would be pre-assembled together prior to installing the deck lid 30 to the vehicle. During assembly, a conventional holding fixture would bring the pre-assembled deck lid 30 and hinge assemblies 32 and 34 to the trunk compartment, tilt the deck lid to allow the hinge boxes 40 to be floated into position against the support 18. Note that the support 18 has troughs 102 provided with oversized openings 103 to enable the hinge boxes 40 to be floated or moved through the openings 103 from the underside of the support 18 until the flanges 55 and 56 engage the underside of the support 18. The deck lid 30 would then be positioned over the trunk opening so that it is properly aligned therewith fore and aft and side to side. The flanges 55 and 56 and the support 18 would be provided with aligned openings 104 (openings not shown on the support)

through which suitable fasteners or bolts 105 can extend. The flanges 55 and 56 would be provided with openings 104 which are oversized (both fore and aft and sideways) so that the deck lid 30 could be properly aligned fore and aft and side to side, when aligned, the bolts could be secured in place via nuts (not shown). Note that no inherent stress (fore or aft or side by side) is placed on the deck lid and hinge assembly 30 via this securement.

Then the holding fixture would be removed and, as is conventional, a deck lid opening assist, here shown as a torsion spring 110, having one end suitably secured to the vehicle support structure 18 and the other end stressed and engaging the hinge strap 44, would be mounted in place. When this is completed the vertical alignment or flushness of the deck lid 30 with adjacent body structure would be checked. If any adjustment is needed, the operator would use a tool to rotate the adjustment fastener 81 to either raise or lower the hinge pin 42, which in turn will raise or lower the deck lid 30. Note that the hinge pin 42 will remain trapped in the slots **51*b*, 52*b* and 85 and 86 irrespective of the vertical position it is adjusted to (see FIG. 3). To prevent the hinge pins 42 from becoming disassembled from the slide 80 and hinge boxes 40, suitable retainer rings 112 could be employed. In addition, bushings 114 could be provided between the hinge strap 44 and the sides 51 and 52 of the hinge box 40 to prevent lateral shifting of the hinge strap 44**.

An important advantage of the above-noted vertical adjustment means 70 for the rear deck lid 30 of the vehicle A is that the hinge assemblies can be preassembled to the deck lid, the hinge boxes 40 can be assembled in place on the inner shelf panel 18 and thereafter the deck lid 30 adjacent its end near the rear window 16 can be readily adjusted vertically by merely rotating the fastener 81 to shift the slide 80. In addition, it should be apparent that the ready adjustment means 70 is of a very simple and economical construction.

Although the illustrated embodiment thereof has been described in great detail, it should be apparent that certain modifications, changes and adaptations may be made in the illustrated embodiment, and that it is intended to cover all such modifications, changes and adaptations which come within the spirit of the present invention.

The embodiments of the invention in which an exclusive property or privilege is claimed are defined as follows:

1. In an automotive vehicle having body structure including spaced side quarter panels and spaced supports extending transversely to said quarter panels which together define a compartment having a top opening, a closure, a pair of spaced hinge assemblies for swingably supporting said closure for movement between an open position to permit access to said compartment and a closed position in which said closure covers said compartment, each of said hinge assemblies comprising a hinge box having spaced vertical sides and with the hinge box being mounted to one of said transverse supports, a generally horizontal pivot means extending through aligned openings in the sides of said hinge box, a hinge strap having one end mounted to said closure and its other end pivotally connected to said pivot means, and adjustment means for vertically raising and lowering the pivot means and hence the closure so that its exterior surface will be flush with adjacent exterior body structure of the vehicle, the improvement being that the adjustment means for raising and lowering said closure comprises providing vertically extending slots in the sides of said hinge box and providing a slide having a pair of spaced sides, said slide being slidably guided and supported for horizontal movement in opposite directions; said sides of said slide having elongated slots which, overlie and are skewed with respect to the vertical slots in said hinge box, said pivot means extending through said slots in said slide, and an adjustable fastener means having one end rotatably connected to said hinge box and being threadably engaged with said slide for effecting horizontal shifting movement of said slide relative to said hinge box when rotated to cause said pivot means to be raised or lowered so that the closure can be raised and lowered at its end adjacent the hinge box to enable the closure to be vertically adjusted so that its exterior surface will be flush with the adjacent vehicle body structure.

2. In an automotive vehicle having body structure including spaced rear side quarter panels and spaced supports extending transversely to said quarter panels which together define a trunk compartment having a top opening, a deck lid, a pair of spaced hinge assemblies for swingably supporting said deck lid for movement between an open position to permit access to said compartment and a closed position in which said deck lid covers said compartment, each of said hinge assemblies comprising a hinge box having spaced vertical sides and with the hinge box being mounted to one of said transverse supports, a hinge pivot extending through aligned openings in the sides of said hinge box, a hinge strap having one end mounted to said deck lid and its other end pivotally connected to said hinge pivot, and adjustment means for vertically raising and lowering the deck lid so that its exterior surface will be flush with adjacent exterior surfaces of the quarter panels of said vehicle, the improvement being that the adjustment means for raising and lowering said deck lid so that when the deck lid is in its closed position its exterior surface will be flush with the adjacent exterior surfaces of the quarter panels of the vehicle comprises providing vertically extending linear slots in the sides of said hinge box and providing a U-shaped slide straddling said hinge box and having a pair of spaced sides and a bight at one end, first means on said hinge box for slidably and guidably supporting said slide for horizontal movement in opposite directions in which the bight of said slide moves toward and from an end wall on said hinge box, said sides of said slide having elongated linearly extending slots which overlie and are skewed with respect to the vertical slots in said sides of said hinge box, said hinge pivot extending through said slots in the sides of said slide, and an adjustable fastener means having a tool engaging head, a threaded shank threadably engaged with a threaded opening in said bight of said slide and a distal end rotatably connected to said end wall of said hinge box, said fastener means being rotatable to cause said slide to be horizontally moved relative to said hinge box and with side surfaces of said slide defining said skewed slots causing said hinge pivot to be moved vertically within the slots in the sides of the hinge box so that the deck lid can be raised and lowered at its end adjacent the hinge box to enable the deck lid to be vertically adjusted so that its exterior surface will be flush with the adjacent exterior body surfaces of the quarter panels of the vehicle.

3. In an automotive vehicle, as defined in claim 2, and wherein said linear vertical slots in said sides of said hinge box and the skewed slots in the sides of said slide have longitudinal axes which intersect and form an acute included angle of approximately 45°.

4. In an automotive vehicle, as defined in claim 2, and wherein said first means on said hinge box for horizontally guiding said slide includes a pair of downwardly facing channels integral with said hinge box for slidably receiving upper side edge portions of said sides of said slide, and flanges integral with the sides on said hinge box for slidably engaging lower side edge surfaces of the sides of said slide.

* * * * *